Aug. 18, 1925.
L. L. JONES
CONDENSER
Filed June 7, 1924
1,549,882
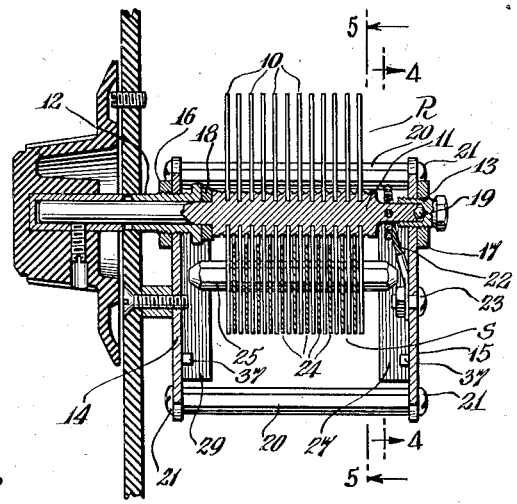
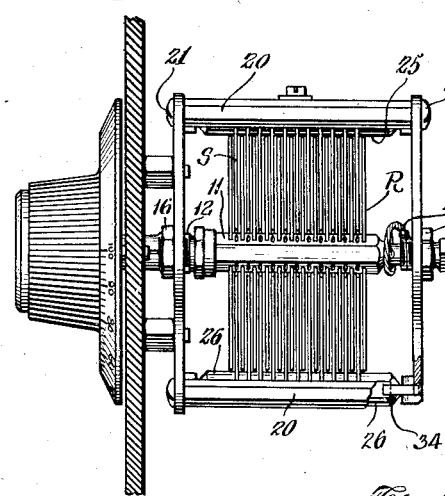
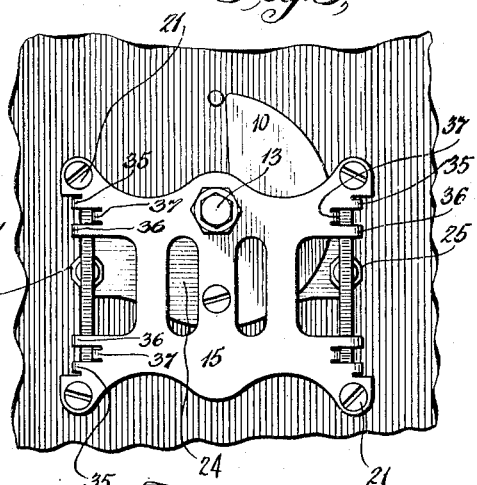
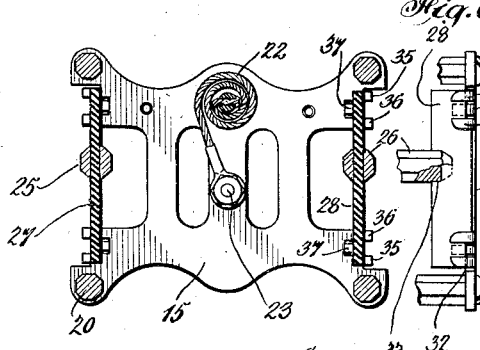
Inventor
Lester L. Jones
By his Attorneys
Cavanagh + James Patented Aug. 18, 1925.

1,549,882

UNITED STATES PATENT OFFICE.

LESTER L. JONES, OF ORADELL, NEW JERSEY, ASSIGNOR TO AMSCO PRODUCTS INC., OF NEW YORK, N. Y., A CORPORATION OF NEW YORK.

CONDENSER.

Application filed June 7, 1924. Serial No. 718,423.

*To all whom it may concern:*

Be it known that I, LESTER L. JONES, a citizen of the United States, and resident of Oradell, in the county of Bergen and State of New Jersey, have invented certain new and useful Improvements in Condensers, of which the following is a specification.

This invention relates to electrical condensers, and more particularly to variable air condensers; and has special reference to the provision of an improved variable air condenser of the rotor and stator type.

A prime object of my present invention relates to the provision of an air condenser having rotor and stator plate sets in which one set is insulatably supported on the other set in a manner so as to reduce to a minimum the losses due to absorption media in the electrostatic field of the condenser.

As is well known, absorption media in the electrostatic field of the condenser have the effects of producing a phase angle or power loss in the condenser, and of varying the capacity characteristics of the same, since the capacity of a condenser having a phase angle varies with the frequency impressed thereon. The insulating medium which is used to separate or insulate the plates or plate sets of opposite potentials of a condenser provides an obsorption region which undesirably produces high power losses, the effects of which are most pronounced in condensers of small capacities. The degree of absorption of these insulating media for any given insulating material or substance is directly dependent upon the strength of the field at such absorption media, and hence upon a number of factors, prime among which are the amount or volume of insulating material in the electrostatic field, the mass of the conductors of opposite potentials, and the proximity of such conducting mass to the insulating dielectric.

To produce a condenser of low loss and consequent high efficiency, it is therefore essential to reduce to a minimum the amount or volume of the absorption dielectric in the form of insulating supports, and to so dispose the conducting masses as to produce a weak electrostatic field in the region of the insulating supports. It is desirable, however, in order to firmly and ruggedly support the plate sets one with respect to the other, to employ sufficient insulating material which will withstand the supporting thrusts and stresses, and the tendency to warping when under stress. A prime desideratum of my present invention comprehends the provision of a condenser in which the insulating supports are designed and arranged so that the maximum strength of the insulating material is utilized for support, while the amount or volume of the insulating material is reduced to a minimum, and in which the insulating supports and the conducting material of opposite potentials are interrelated so as to minimize the strength of the electrostatic field in the region of such insulating supports.

Further and correlated objects of the invention relate to the provision of a variable air condenser in which the rotor and stator units are constructed so as to be subject to simplicity of assembling operations.

To the accomplishment of the foregoing and such other objects as may hereinafter appear, my invention consists in the elements and their relation one to the other as hereinafter particularly described and sought to be defined in the claims; reference being had to the accompanying drawings, which show the preferred embodiment of my invention, and in which:—

Fig. 1 is a cross-sectional elevational view of the condenser embodying my invention, showing the same attached to a panel, Fig. 2 is a top plan view thereof with parts broken away, Fig. 3 is a rear elevational view of the same, Fig. 4 is a view taken in cross-section on the line 4—4, Fig. 1, Fig. 5 is a view taken in cross-section on the line 5—5, Fig. 1, and Fig. 6 is a fragmentary view showing the manner of supporting the parts of the condenser.

Referring now more in detail to the drawings, the air condenser of my invention comprises a movable plate or rotor unit R and a stationary plate or stator unit S supported on the rotor unit in such a manner as to reduce to a minimum the strength of the electro-static field between the rotor and stator at the mutual supporting regions thereof.

The rotor unit R comprises a plurality of spaced plates 10, 10 fixed to the rotor shaft 11 which is journalled in opposite end bearings in the form of bushings 12 and 13 threadedly received by metallic end plates 14 and 15, the bushings being adjustable in the end plates for adjusting the position of the rotor plates, and being locked in position by means of the nuts 16 and 17 threadedly received by the bushings and engaging the opposite walls of the end plates, as clearly shown in the drawings.

For minimizing the wear between the bushing 12 and the shaft 11 at one end thereof, there is provided an insert washer 18 of hardened material, and for facilitating the rotation of the rotor plates, the other end of the shaft is provided with a ball bearing 19 contained in the bushing 13.

These parts are secured in position by means of the spaced posts 20, 20 (four in number), each of which is attached at its opposite ends to the end plates by means of the screws 21, 21, producing a rotor unit in which the end plates 14 and 15 are conductively integral with the condenser plates 10, 10. Preferably the rotor shaft 11 is electrically connected to the end plate 15 by an additional conductive connection 22 which is secured at its opposite ends to the shaft and the end plate, one end forming a binding post 23.

The stator unit S comprises a plurality of plates 24, 24 arranged to interleave with the rotor plates 10, 10 in a manner well known in the art, and the said stator plates are secured to and supported by a plurality and preferably a pair of posts 25 and 26.

For supporting the stator unit S on the rotor unit R so as to minimize the absorption media in the electrostatic field therebetween, I provide a plurality of insulating members, and preferably a plurality of pairs of such insulating members or pieces, a pair of insulating pieces being carried by each end supporting plate and carrying the stator unit at one end thereof, the said insulating pieces comprising beams 27 and 28 forming one pair of insulating supports and associated with the end plate 15, and the beams 29 and 30 forming the other pair of insulating supports and associated with the end plate 14. For minimizing the amount or volume of insulating material while utilizing the maximum supporting strength of the same, the insulating beams 27 to 30 are each arranged in a plane normal to the plane of the end supporting plates 14 and 15, and more specifically, each of these insulating beams transversely carried by the end supporting plates is made of an insulating sheet material and is arranged with the plane of the sheet material normal to the plane of the end supporting plates so that the plane of the sheet material is parallel to the supporting thrusts which are effective on the stator posts 25 and 26. Desirably also each of the beams 27 to 30 is carried by the end supporting plates at its opposite ends, and is connected to the stator supporting posts at points intermediate its ends in a manner to be described presently. With this construction, it will be noted that the thickness and width of the insulating beams may be reduced to a minimum, while the maximum strength of the material is utilized for supporting purposes.

For minimizing the strength of the electrostatic field in the region of the insulating beams 27 to 30, the condenser of my invention is designed and constructed so as to reduce the mass of metal in the region of said insulating supports, and to increase the distance between conductors of opposite potentials. To accomplish this, it is desirable to eliminate all securing elements which are usually employed for attaching the rotor and stator units to the insulating supports, since these securing elements increase the metallic mass and increase the electrostatic lines of force through the dielectric; and in the condenser embodying my invention, the end plates 14 and 15, the stator supporting posts 25 and 26, and the insulating beams 27 to 30, are provided with dovetailing interengaging means constructed so as to reduce the volume of metal and increase the distance between conductors of opposite potential, the interengaging means being moreover so designed as to effect the rigid securing or locking of the stator plate set in supported position.

In the preferred construction for obtaining the interengagement between the supporting elements, each beam is notched at its opposite ends as at 31 and 32, and is notched at a region 33 intermediate the ends, these notches being provided for interengagement with locking elements formed integrally with the end plates and stator posts. For interengagement with an intermediate notch 33 (see Figs. 2 and 6), the stator posts are grooved as at 34 (see Fig. 2), the end of a stator post having a forked construction which dovetails with the notch 33, the tines of the fork engaging opposite walls of a supporting beam. For interengagement with the notches 31 and 32, each end plate is provided with a plurality of upstanding lugs forming cradles, each cradle consisting of two outer lugs 35 and 36 and an inner lug 37 arranged so as to engage opposite walls of a beam, as clearly shown in Figs. 2 to 5 of the drawings, the seating of each cradle in its complemental notch and the dovetailing of the stator posts with the beams producing a construction in which the stator unit is effectively locked to the rotor unit against movement in any direction.

By providing the interengaging dovetailing means for the supporting elements, not only is the necessity for additional metallic securing elements obviated, but a better distribution of dielectric loss is produced because the source of high potential area is reduced to less than one-half of the beam thickness and is limited to a surface rather than to a volume dielectric effect. To further minimize the mass of metal in the region of the absorption dielectric, the sides of the end plates 14 and 15 are excised or cut away, as clearly shown in the drawings. The elimination of all securing screws produces, moreover, a construction in which the stator and rotor units may be assembled with rapidity and facility in the manufacturing of the condenser.

While I have shown the preferred embodiment of my invention, it will be apparent that many changes and modifications may be made in the structure disclosed without departing from the spirit of the invention, defined in the following claims:

1. A variable air condenser comprising a rotor plate set, end supporting plates therefor, a stator plate set and means for supporting the stator plate set on the end supporting plates, said means consisting of pairs of transversely arranged insulating beams, a pair carried by each of the end supporting plates and carrying one side of the stator plate set, each of said beams being arranged in a plane normal to the plane of the supporting plates.

2. A variable air condenser comprising a rotor plate set, metallic end supporting plates conductively integral therewith, a stator plate set and means for supporting the stator plate set on the end supporting plates, said means consisting of pairs of transversely arranged insulating beams, a pair carried by each of the end supporting plates and carrying one side of the stator plate set, each of said beams being made of an insulating sheet material and being arranged with the plane of the sheet material normal to the planes of the end supporting plates.

3. In a variable air condenser, a rotor unit comprising a rotor plate set, metallic end supporting plates conductively integral therewith and a plurality of posts connecting the end supporting plates, a stator unit comprising a stator plate set and posts carrying the same, and means supporting the stator unit on the rotor unit consisting of pairs of transversely arranged insulating beams, a pair carried by each of the end supporting plates and connected to the stator posts at one end of the latter, each of the insulating beams being made of an insulating sheet material and being arranged with the plane of the sheet material normal to the planes of the end supporting plates so that the plane of the sheet material is parallel to the supporting thrusts on the stator posts.

4. In a variable air condenser, a rotor unit comprising a rotor plate set, metallic end supporting plates conductively integral therewith and a plurality of posts connecting the end supporting plates, a stator unit comprising a stator plate set and posts carrying the same, and means supporting the stator unit on the rotor unit consisting of pairs of transversely arranged insulating beams, a pair carried by each of the end supporting plates and connected to the stator posts at one end of the latter, each of the insulating beams being carried by its supporting plate at spaced points thereon and being connected to a stator post at a point intermediate the spaced points, each of the said beams being also made of an insulating sheet material and being arranged with the plane of the sheet material normal to the planes of the end supporting plates so that the plane of the sheet material is parallel to the supporting thrusts on the stator posts.

5. A variable air condenser comprising a rotor plate set, end supporting plates therefor, a stator plate set and means supporting the stator plate set on the end supporting plates, the said means consisting of a plurality of insulating pieces carried by the end plates and carrying the stator plate set, the said end plates, stator plate set and insulating pieces being provided with dovetailing interengaging means effective for locking the stator plate set in supported position.

6. A variable air condenser comprising a rotor plate set, end supporting plates therefor, a stator plate set and means for supporting the stator plate set on the end supporting plates, said means consisting of pairs of transversely arranged insulating beams, a pair carried by each of the end supporting plates and connected to one side of the stator plate set, the said end plates, stator plate set and insulating beams being provided with dovetailing interengaging means effective for locking the stator plate set in supported position.

7. A variable air condenser comprising a rotor plate set, end supporting plates therefor, a stator plate set and means supporting the stator plate set on the end supporting plates, the said means consisting of a plurality of transversely arranged insulating pieces carried by the end plates and carrying the stator plate set and arranged in planes normal to the planes of the end plates, the said end plates, stator plate set and insulating pieces being provided with dovetailing interengaging means effective for locking the stator plate set in supported position.

8. A variable air condenser comprising a rotor plate set, end supporting plates therefor, a stator plate set and means for supporting the stator plate set on the end supporting plates, said means consisting of pairs of transversely arranged insulating beams, a pair carried by each of the end supporting plates and carrying one side of the stator plate set, each of the insulating beams being carried by its supporting plate at spaced points thereon and being connected to the stator plate set at a point intermediate the spaced points, the said end plates, stator plate set and insulating beams being integrally provided at said points with dovetailing interengaging means effective for locking the stator plate set in supported position.

9. In a variable air condenser, a rotor unit comprising a rotor plate set and metallic end supporting plates conductively integral therewith, a stator unit comprising a stator plate set and a plurality of posts carrying the same, and means supporting the stator unit on the rotor unit consisting of pairs of transversely arranged insulating beams, a pair carried by each of the end supporting plates and connected to the stator posts at one end of the latter, each of the said beams being notched at its opposite ends and at a point intermediate such ends, the stator posts being grooved at each end for interengaging with the intermediate notch of a beam, and the end plates being provided with integral upstanding lugs forming cradles interengaging with opposite ends of the insulating beams at the notches provided therein, the interengagement between the parts being effective for locking the stator unit to the rotor unit against movement in all directions.

10. In a variable air condenser, a rotor unit comprising a rotor plate set, metallic end supporting plates conductively integral therewith and a plurality of posts connecting the end supporting plates, a stator unit comprising a stator plate set and a pair of posts carrying the same, and means for supporting the stator unit on the rotor unit consisting of pairs of transversely arranged insulating beams arranged in planes normal to the end plates, a pair of said beams being carried by each of the end plates and connected to the stator posts at one end of the latter, each of said beams being notched at its opposite ends and at a point intermediate such ends, the stator posts being grooved at each end for interengaging with the intermediate notch of the beam, and the end plates being provided with integral spaced upstanding lugs forming cradles interengaging with opposite ends of the insulating beams at the notches provided therein, the interengagement between the parts being effective for locking the stator unit to the rotor unit against movement in all directions.

Signed at New York city in the county of New York and State of New York this 4th day of June A. D. 1924.

LESTER L. JONES.